(12) United States Patent
Ayoub (10) Patent No.: US 11,288,624 B2
(45) Date of Patent: Mar. 29, 2022

(54) METHOD AND SYSTEM FOR YARD ASSET MANAGEMENT

(71) Applicant: BlackBerry Limited, Waterloo (CA)

(72) Inventor: Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 409 days.

(21) Appl. No.: 16/100,146

(22) Filed: Aug. 9, 2018

(65) Prior Publication Data

US 2020/0051005 A1 Feb. 13, 2020

(51) Int. Cl.
*G06Q 10/08* (2012.01)
*G06K 9/00* (2022.01)
*G06Q 10/04* (2012.01)

(52) U.S. Cl.
CPC ....... *G06Q 10/087* (2013.01); *G06K 9/00664* (2013.01); *G06Q 10/043* (2013.01)

(58) Field of Classification Search
CPC ........ G06Q 10/00; G06Q 10/02; G06Q 10/08; G06F 19/00; G06F 17/00; B61L 25/00; B61L 25/02; B61L 17/00; G08G 1/14
USPC ...... 705/7.13, 7.39, 22, 5, 7.15, 64, 28, 333; 455/456.5, 456.1; 700/33, 34, 36; 340/988, 539.22; 246/124
See application file for complete search history.

(56) References Cited

U.S. PATENT DOCUMENTS

| | | | | |
|---|---|---|---|---|
| 5,122,959 A * | 6/1992 | Nathanson | ............. | G08G 1/202 340/993 |
| 5,880,958 A * | 3/1999 | Helms | ................... | G08G 1/202 701/117 |
| 6,415,219 B1 * | 7/2002 | Degodyuk | ........... | G08G 5/0082 701/117 |
| 6,587,738 B1 * | 7/2003 | Belcea | ................ | B61L 27/0027 700/33 |
| 6,687,583 B1 * | 2/2004 | Knoska | ................. | G01M 17/00 701/31.5 |
| 6,975,997 B1 * | 12/2005 | Murakami | .............. | B60L 53/30 705/5 |
| 7,528,715 B2 * | 5/2009 | Lee | ........................ | G06Q 10/00 340/539.18 |
| 7,561,069 B2 * | 7/2009 | Horstemeyer | ... | G06Q 10/06311 340/994 |
| 7,567,811 B2 * | 7/2009 | Simpson | ............... | H04W 99/00 455/456.1 |
| 7,898,411 B2 * | 3/2011 | Brosius | .............. | G06Q 10/0833 340/539.22 |

(Continued)

FOREIGN PATENT DOCUMENTS

WO 9938136 A2 7/1999

OTHER PUBLICATIONS

European Patent Office, extended European search report for Application No. 19187368.6, dated Jan. 13, 2020.

(Continued)

*Primary Examiner* — Olusegun Goyea
(74) *Attorney, Agent, or Firm* — Moffat & Co (57) ABSTRACT

A method at a computing device for determining future utilization of a shipping yard, the method including detecting a number of assets within the shipping yard; determining, based on asset scheduling information, future yard activity; and correlating the number of assets within the shipping yard with the future yard activity to provide a predictive yard utilization.

17 Claims, 6 Drawing Sheets

(56) References Cited

U.S. PATENT DOCUMENTS

| | | | | |
|---|---|---|---|---|
| 8,055,533 B2* | 11/2011 | Rust | ................. | G05B 19/4182 705/13 |
| 2002/0084387 A1* | 7/2002 | Matheson | ............... | B61L 17/00 246/124 |
| 2002/0161509 A1* | 10/2002 | Fawcett | ............. | G06Q 10/0875 705/28 |
| 2003/0014288 A1* | 1/2003 | Clarke | ............. | G06Q 10/06316 705/7.26 |
| 2003/0040944 A1* | 2/2003 | Hileman | ................ | G06Q 10/08 705/5 |
| 2003/0069680 A1* | 4/2003 | Cohen | .................. | G06Q 10/08 701/50 |
| 2003/0233189 A1* | 12/2003 | Hsiao | ..................... | G01C 21/26 701/521 |
| 2004/0024711 A1* | 2/2004 | Camping | ............ | G06Q 10/087 705/64 |
| 2005/0002544 A1* | 1/2005 | Winter | ..................... | G08G 1/14 382/104 |
| 2006/0059023 A1* | 3/2006 | Mashinsky | ............ | G06Q 10/02 705/5 |
| 2006/0206387 A1* | 9/2006 | Peterkofsky | ......... | G06Q 20/203 705/22 |
| 2006/0261164 A1* | 11/2006 | Bochicchio | ........ | G01G 23/3742 235/385 |
| 2007/0005200 A1* | 1/2007 | Wills | .................. | B61L 27/0011 701/19 |
| 2007/0027593 A1* | 2/2007 | Shah | ..................... | B60W 50/00 701/29.4 |
| 2007/0150130 A1* | 6/2007 | Welles | .................... | B61L 17/00 701/19 |
| 2007/0247282 A1 | 10/2007 | Olsen et al. | | |
| 2007/0291985 A1* | 12/2007 | Krahnstoever | ........ | H04N 7/181 382/103 |
| 2008/0027772 A1* | 1/2008 | Gernega | ................ | G06Q 10/04 705/7.26 |
| 2008/0154692 A1* | 6/2008 | Logan | .................... | B61L 17/00 701/19 |
| 2008/0294491 A1* | 11/2008 | Hersh | .................... | G06Q 10/08 705/7.13 |
| 2008/0312820 A1* | 12/2008 | Kapoor | ................ | G06Q 10/047 701/533 |
| 2009/0030770 A1* | 1/2009 | Hersh | .................. | G06Q 10/087 705/7.13 |
| 2009/0082962 A1* | 3/2009 | Kim | ..................... | G01C 21/362 701/469 |
| 2009/0083091 A1* | 3/2009 | Rust | .................. | G06Q 10/0631 705/7.13 |
| 2009/0099897 A1* | 4/2009 | Ehrman | ................ | G06Q 10/06 705/7.15 |
| 2009/0099898 A1* | 4/2009 | Ehrman | ................ | G06Q 10/06 705/7.15 |
| 2009/0143927 A1* | 6/2009 | Julich | .................... | G06Q 10/06 701/19 |
| 2009/0157461 A1* | 6/2009 | Wright | .................. | G06Q 10/06 705/7.23 |
| 2009/0189788 A1* | 7/2009 | Faus | ........................ | G08G 1/20 340/989 |
| 2009/0326991 A1* | 12/2009 | Wei | .................. | G06Q 10/08355 705/5 |
| 2011/0052001 A1 | 3/2011 | Tan et al. | | |
| 2011/0093306 A1* | 4/2011 | Nielsen | .............. | G06Q 10/0631 705/7.13 |
| 2011/0130914 A1* | 6/2011 | Shah | ..................... | B60W 50/00 701/29.5 |
| 2013/0062474 A1* | 3/2013 | Baldwin | ............... | B61L 29/282 246/122 R |
| 2013/0113936 A1* | 5/2013 | Cohen | ...................... | G08G 1/14 348/148 |
| 2013/0325740 A1* | 12/2013 | McKethan | ......... | G06Q 10/0838 705/333 |
| 2016/0112837 A1* | 4/2016 | Varoglu | .................. | H04W 4/90 455/404.2 |
| 2016/0210851 A1* | 7/2016 | Oshima | .................... | G08G 1/13 |
| 2017/0316690 A1* | 11/2017 | Charles | ................. | G08G 1/146 |
| 2018/0308191 A1* | 10/2018 | Matthiesen | ........ | G01C 21/3438 |
| 2018/0315146 A1* | 11/2018 | Matthiesen | ...... | G06Q 10/06315 |
| 2018/0350157 A1* | 12/2018 | Koreishi | ................ | G07B 15/02 |
| 2019/0005446 A1* | 1/2019 | McKethan | ............. | G06Q 10/06 |

OTHER PUBLICATIONS

European Patent Office, Office Action for Application No. 19187368. 6, dated Oct. 18, 2021.

* cited by examiner

METHOD AND SYSTEM FOR YARD ASSET MANAGEMENT

FIELD OF THE DISCLOSURE

The present disclosure relates to the transportation of goods, and in particular relates to utilization of storage yards in the transportation of goods.

BACKGROUND

When transporting goods, shipping yards are often used for storage, as a starting point for goods, or as a destination for goods, among other purposes. As used herein, a shipping yard may be a trailer yard, railyard or similar storage facility.

Counting assets in a yard is challenging and knowing if such shipping yard is reaching full capacity is important. Specifically, when an asset approaches a yard, if there are no parking spots, a driver may circle the yard looking for a parking spot without any hope. This results in a waste of time, may create traffic issues by having a truck block the way when a driver does not know what to do, among other issues.

A full yard may cause a driver that is currently in such yard to be relocated to another nearby empty yard. This wastes time and may cost more money for the shipping company.

BRIEF DESCRIPTION OF THE DRAWINGS

The present disclosure will be better understood with reference to the drawings, in which.

DETAILED DESCRIPTION

The present disclosure provides a method at a computing device for determining future utilization of a shipping yard, the method comprising: detecting a number of assets within the shipping yard; determining, based on asset scheduling information, future yard activity; and correlating the number of assets within the shipping yard with the future yard activity to provide a predictive yard utilization.

The present disclosure further provides a computing device configured for determining future utilization of a shipping yard, the computing device comprising: a processor; and a communications subsystem; wherein the computing device is configured to: detect a number of assets within the shipping yard; determine, based on asset scheduling information, future yard activity; and correlate the number of assets within the shipping yard with the future yard activity to provide a predictive yard utilization.

The present disclosure further provides a computer readable medium for storing instruction code which, when executed by a processor of a computing device configured for determining future utilization of a shipping yard, cause the computing device to: detect a number of assets within the shipping yard; determine, based on asset scheduling information, future yard activity; and correlate the number of assets within the shipping yard with the future yard activity to provide a predictive yard utilization.

The present disclosure relates to the management of assets within a shipping yard, and in particular, in the embodiments described below, a future anticipated utilization of a shipping yard may be predicted, and remedial action may be taken if the utilization of the yard, compared to the capacity of the yard, exceeds a threshold.

In particular, a dispatcher may send an asset such as a truck or trailer to a particular shipping yard during normal shipping operations. However, yards may be very busy with many trucks going in and out. In this case, a yard may become full, which would cause a driver to be unable to find a spot to park or deposit a trailer.

In some cases where a site is almost full, there may be a few spots available. For example, 2 out of 300 spots may be available. The yard might look full, but knowing that there are empty spots helps the driver to look for the few spots and not lose hope, give up and leave the yard in search of another place to park leading to the problems described above.

From a dispatcher perspective, it may be important to know how many empty spots are currently available in a yard. It may also be useful to know what the anticipated utilization of the yard is within the next few hours. This would allow the dispatcher to take action to move assets out of the yard or take other suitable actions such as rerouting drivers currently on route to other sites to avoid having the yard at over-capacity.

At a company level, it may be important to see a current usage of each yard and its historic and potentially future usage. This type of data allows for a company to take suitable action to deal with capacity situations at yards, including rerouting or moving assets to nearby locations, building new yards or expanding existing yards, among other options.

Based on the above, the present disclosure provides for a yard management method and system which allows for future estimations of asset capacity within shipping yards by a fleet operator.

Figure 1:
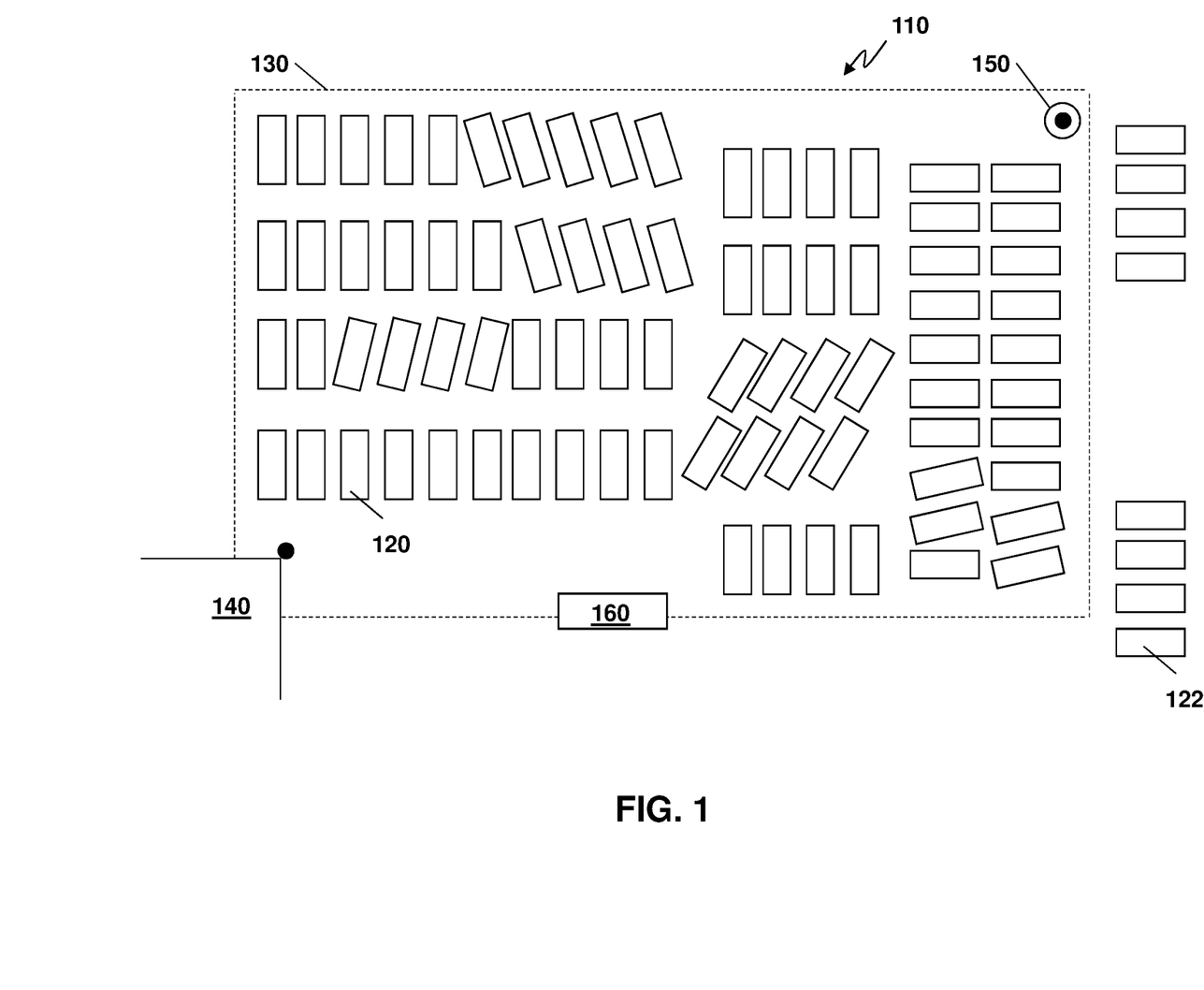
FIG. 1 is a block diagram showing an example configuration of shipping containers in a container yard.

Reference is now made to FIG. 1, which shows a simplified environment of a shipping yard 110. Storage yard 110 includes a plurality of shipping containers 120. In some cases, the shipping containers 120 may be within a fenced area 130. However, due to the dynamic nature of the shipping yard, some containers, shown with reference 122, are outside of the fenced area 130. Further, in many cases shipping yard 110 may simply be too big to have a fenced area 130.

Fixed infrastructure points within the shipping yard 110 may exist. For example, a building 140 or a fixed structure 150 such as a lamppost, security pole, or crane, among other options, may exist within the shipping yard 110.

Shipping containers 120 or 122 may be placed in rows, or stacked, or simply deposited in an empty location.

A shipping yard may have fixed ingress or egress points 160, which may allow for control of assets entering or exiting the yard and also may allow for a count of assets within the yard.

In accordance with one aspect of the present disclosure, all or a subset of the vehicles or trailers within the shipping yard may include a sensor apparatus. In particular, in one embodiment, a subset of containers 120 or 122 may have associated therewith a sensor apparatus that can be triggered to obtain information about the trailer or vehicle and communicate the results to a centralized server.

Thus, in the embodiments of the present disclosure, sensor systems may be included on the vehicle. A transportation company may have a plurality of sensor apparatuses operating remotely from a central monitoring station to provide remote sensor data to a management or monitoring hub. The sensors may be placed on a trailer, shipping container or similar product to provide a central station with information regarding the container. Such information may include, but is not limited to, information concerning the current location of the trailer or shipping container, the temperature inside the shipping container or trailer, operational parameters such as tire pressure or engine temperature, that the doors on the shipping container or trailer are closed, whether a sudden acceleration or deceleration event has occurred, the tilt angle of the trailer or shipping container, among other data. In some cases, they sensor apparatus merely provides the location of the trailer, and no other sensor information is provided.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus or computing device that is capable of providing data or information from sensors associated with the sensor apparatus to a central monitoring or control station. Sensors associated with the sensor apparatus may either be physically part of the sensor apparatus, for example a built-in global navigation satellite system (GNSS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses.

Figure 2:
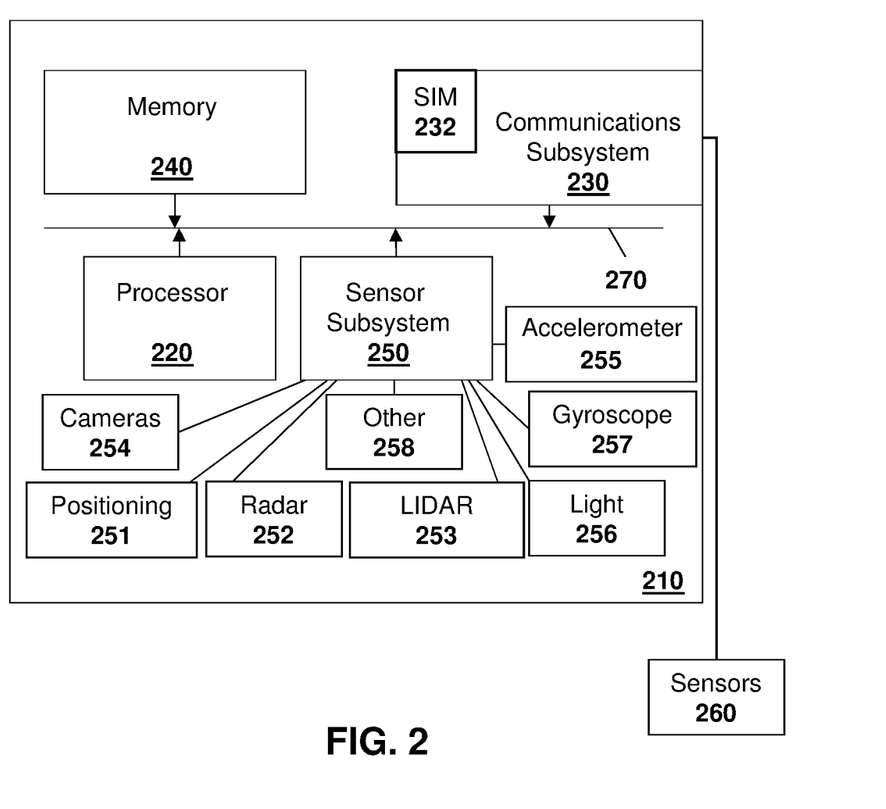
FIG. 2 is a block diagram of an example image sensor apparatus capable of being used with the embodiments herein.

One sensor apparatus is shown with regard to FIG. 2. The sensor apparatus of FIG. 2 is however merely an example and other sensor apparatuses could equally be used in accordance with the embodiments of the present disclosure.

Reference is now made to FIG. 2, which shows an example sensor apparatus 210. Sensor apparatus 210 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 230 will be dependent upon the communication network or communication technology on which the sensor apparatus is intended to operate.

If communications subsystem 230 operates over a cellular connection, a subscriber identity module (SIM) 232 may be provided to allow such communication. SIM 232 may be a physical card or may be virtual. In some embodiments SIM 232 may also be referred to as a universal subscriber identity module (USIM), as merely an identity module (IM), or as an embedded Universal Integrated Circuit Card (eUICC), among other options.

Processor 220 generally controls the overall operation of the sensor apparatus 210 and is configured to execute programmable logic, which may be stored, along with data, using memory 240. Memory 240 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium, for example through communications subsystem 230.

In the embodiment of FIG. 2, sensor apparatus 210 may utilize a plurality of sensors, which may either be part of sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a RADAR sensor 252, a LIDAR 253, one or more image sensors 254, accelerometer 255, light sensors 256, gyroscopic sensors 257, and other sensors 258. Other sensors may be any sensor that is capable of reading or obtaining data that may be useful for sensor apparatus 210. However, the sensors shown in the embodiment of FIG. 2 are merely examples, and in other embodiments different sensors or a subset of sensors shown in FIG. 2 may be used. For example, in one embodiment of the present disclosure, only a positioning sensor is provided.

The positioning sensor may use a positioning subsystem such as a Global Navigation Satellite System (GNSS) receiver which may be, for example, a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system Other sensors may be external to the sensor apparatus 210 and communicate with the sensor apparatus 210 through, for example, communications subsystem 230. Such other sensors are shown as sensors 260 and the embodiment of FIG. 2. For example, a tire pressure monitoring system may communicate over short range communications such as Bluetooth™ Low Energy with communications subsystem 230 on the sensor apparatus 210. Other examples of sensors 260 are possible.

Further, the sensor apparatus 210 of FIG. 2 may, in some embodiments, act as a gateway, and may communicate with other sensor apparatuses (not shown) on the trailer, where the other sensor apparatuses may act as hubs for a subset of the sensors on the vehicle or trailer.

Communications between the various elements of sensor apparatus 210 may be through an internal bus 270 in one embodiment. However, other forms of communication are possible.

Sensor apparatus 210 may be affixed to any fixed or portable platform. For example, sensor apparatus 210 may be affixed to shipping containers, truck trailers, truck cabs in one embodiment. In other embodiments, sensor apparatus 210 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 210 could be carried by a user.

Such sensor apparatus 210 may be a power limited device. For example, sensor apparatus 210 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 210 may utilize external power, for example from the engine of a tractor pulling the trailer, from a land power source for example on a plugged in recreational vehicle or from a building power supply, among other options.

External power may further allow for recharging of batteries to allow the sensor apparatus 210 to then operate in a power limited mode again. Recharging methods may also include other power sources, such as, but not limited to, solar, electromagnetic, acoustic or vibration charging.

The sensor apparatus from FIG. 2 may be used in a variety of environments. One example environment in which the sensor apparatus may be used is shown with regard to FIG. 3.

Figure 3:
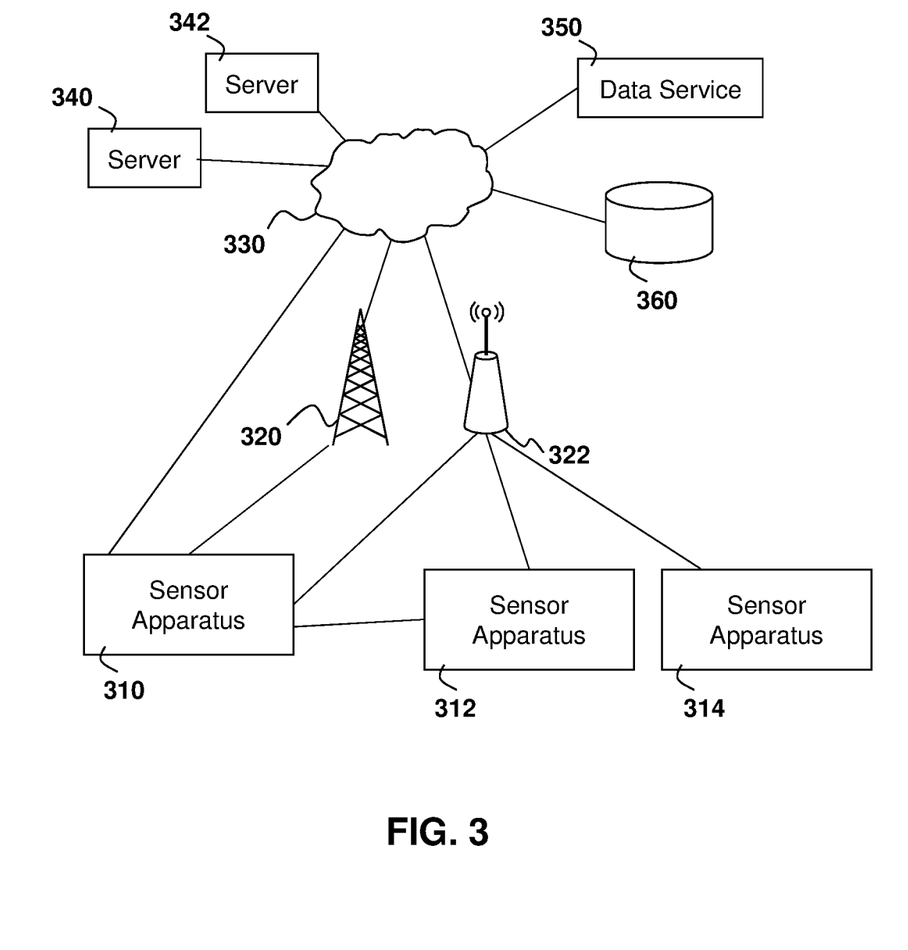
FIG. 3 is a block diagram showing communications between servers and shipping containers.

Referring to FIG. 3, three sensor apparatuses, namely sensor apparatus 310, sensor apparatus 312, and sensor apparatus 314 are provided.

In the example of FIG. 3, sensor apparatus 310 may communicate through a cellular base station 320 or through an access point 322. Access point 322 may be any wireless communication access point. For example, access point 322 may be a WiFi router or a private router network. Also, a private router network may have a path from the access point name (APN) to a server, and may reduce network latency based on a location of the sensor apparatus in some embodiments.

Further, in some embodiments, sensor apparatus 310 could communicate through a wired access point such as Ethernet or fiber, among other options.

The communication may then proceed over a wide area network such as Internet 330 and proceed to servers 340 or 342.

Similarly, sensor apparatus 312 and sensor apparatus 314 may communicate with servers 340 or server 342 through one or both of the base station 320 or access point 322, among other options for such communication.

In other embodiments, any one of sensors 310, 312 or 314 may communicate through satellite communication technology. This, for example, may be useful if the sensor apparatus is travelling to areas that are outside of cellular coverage or access point coverage.

In other embodiments, sensor apparatus 312 may be out of range of access point 322 and may communicate with sensor apparatus 310 to allow sensor apparatus 310 to act as a relay for communications.

Communication between sensor apparatus 310 and server 340 may be one directional or bidirectional. Thus, in one embodiment sensor apparatus 310 may provide information to server 340 but server 340 does not respond. In other cases, server 340 may issue commands to sensor apparatus 310 but data may be stored internally on sensor apparatus 310 until the sensor apparatus arrives at a particular location. In other cases, two-way communication may exist between sensor apparatus 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 310, 312, 314, etc. For example, the server may be located essentially anywhere so long as it has network access to communicate with sensor apparatuses 310, 312, 314, etc.

Server 340 may, for example, be a fleet management centralized monitoring station. In this case, server 340 may receive information from sensor apparatuses associated with various trailers or cargo containers, providing information such as the location of such cargo containers, the temperature within such cargo containers, system information such as tire pressure or vibration sensor readings, any unusual events including sudden decelerations, temperature warnings when the temperature is either too high or too low, accelerometer events such as repeated starting and stopping, indicating a traffic jam, among other data. The server 340 may compile such information and store it for future reference. It may further alert an operator. For example, yard capacity warnings may be provided to an operator.

In other cases, server 340 may compile information regarding estimated arrival times or departure times at a shipping yard.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions. In other cases, data services provider 350 may be a computing system operated by a border agency to provide data on general border conditions or on specific border crossings for vehicles in a fleet. Other functionality for data services provider 350 would be apparent to those skilled in the art.

Data repository or database 360 may for example provide information such as image data associated with a particular location, aerial maps, low latency access point names, virtual SIM information, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of sensor apparatuses 310, 312, or 314 for processing at those sensor apparatuses.

Utilizing the system and devices from FIGS. 2 and 3 above, methods and systems for detecting yard capacity events and possibly taking remedial actions are provided.

Figure 4:
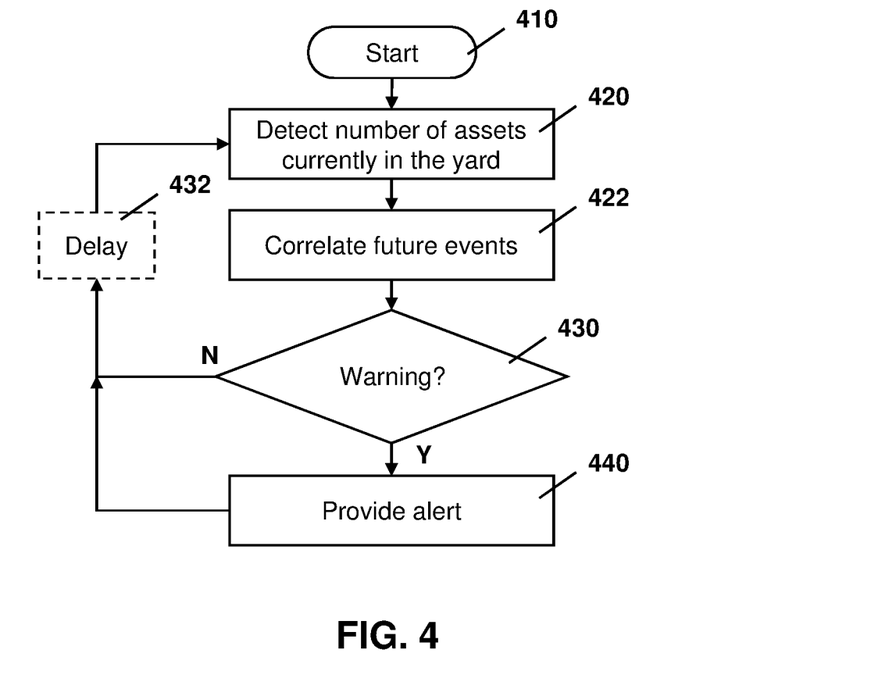
FIG. 4 is a process diagram showing a process at a network element for detecting current and future assets loading within a shipping yard.

In particular, reference is now made to FIG. 4. The process of FIG. 4 starts at block 410 and proceeds to block 420 in which a current number of assets in a shipping yard is detected.

The current number of assets in a shipping yard could be detected in a variety of ways. As used herein, an asset may be any item which may take up space in the shipping yard, and in includes containers, railcars, vehicles such as trucks, and/or a combination of the above, among other options.

In one embodiment, a geofence may exist around the yard, and each vehicle or trailer may be equipped with the sensor apparatus as described above with regard to FIG. 2. The sensor apparatus may provide the positioning of the trailer or vehicle. In this regard, if the position is reported to be within the geofence then a tally may be made of all trailers or vehicles within the geofence to provide an indication of how many vehicles are currently within the yard. A report may similarly be generated on a vehicle exiting the geofence, allowing in the tally of assets within the shipping yard to be updated accordingly.

A capacity of the yard may be known ahead of time and the number of assets within the yard could be compared with the capacity of the yard. In some cases, different sized assets may have different space requirements. In this case, the detection of the number of assets may include asset sizes. In other cases, different areas may have nested geofences, and like sized assets could be placed in a specific nested geofence. In this case, the embodiment of FIG. 4 could be used with regards to each nested geofence.

In other embodiments, the current number of assets in a yard may be detected in other ways. For example, a yard such as that described in FIG. 1 above may have a fixed number of entry or exit points 160. The entry or exit points may further include sensors to tally vehicles entering or leaving the yard. For example, such sensors may be cameras which may then be connected to a computer having image recognition software to detect when a vehicle leaves or enters the yard. In other cases, weight sensors, magnetic sensors, lasers, or other mechanisms for counting vehicles entering or exiting a yard may be utilized at the entrance and egress points of the yard to keep a tally of the number of assets within the yard.

In still further embodiments, the number of vehicles in a yard may be compiled by a sensor apparatus on a second vehicle. For example, the sensor apparatus on the second vehicle may include a camera which, when viewing the yard, may allow for a tally of the vehicles within the yard. In particular, the tally may be done by compiling image data at a server or other computing device from one or more vehicles with image capture devices. The second vehicle may be a shunt vehicle or other vehicle within the yard. In some cases, the second vehicle may be another trailer or vehicle that is moving to a parking spot which may provide data back to a server. In still further cases, the second vehicle may be a plurality of vehicles that include the sensor apparatus and the tally may be a composite of data provided by the plurality of the vehicles.

In still further embodiments, a fixed camera may be positioned, for example, on a pole or a crane, which may have a view of the yard or part of the yard and allow for image processing to determine the current number of vehicles in the yard or that part of the yard.

In still further embodiments, the number of assets in the shipping yard may be found by getting the GPS locations of all assets located within the geofence of the yard.

In still further embodiments, a yard tally may be entered by workers within the yard into a computing system. Thus a manual count by people is possible, with the data being entered into a computer system.

Other options for assessing the current number of assets currently within the yard are also possible.

From block 420, the process then proceeds to block 422 in which future events may be correlated against the number of assets found at block 420. In particular, from shipment information, a transportation management system may know when assets are scheduled to enter or leave a yard. Such information may be utilized to project future usage of the yard.

For example, if a number of assets are scheduled to arrive at the yard within the next few hours, but very few are scheduled to leave, this may indicate that the number of assets in the yard will increase closer to or exceed the capacity of the yard.

The future information may, in some cases, include a buffer time around the scheduled arrival or departure. In this way, assets that arrive early or leave late for example can be included in the estimation for the yard loading.

Further, the future information may be correlated to sensor data on a vehicle or trailer. For example, an asset that is scheduled to arrive in two hours but is showing from its GPS positioning and that it is at least three hours away from the yard could allow for the calculation of the future loading of the art to be adjusted accordingly. Similarly, when an asset clears a border crossing more quickly than scheduled, this may bring forward the arrival time of the asset at the yard.

Similarly, for departures, the scheduling information can be used to project future departures. Sensor data from the vehicle or trailer may be used to update such schedule information. In particular, delays can always happen when an asset leaves a yard. For example, the driver may be late, the asset may not be ready on time, among other factors. In this case, a geofence exit event may be used in some cases to correct the estimate based on the actual exiting of the asset from the art.

Based on the values assessed at blocks 420 and 422, a future projection for the usage of the yard may be made. Thresholds may be created to allow for warnings to be provided to operators if the usage of the yard is within a certain percentage of its capacity. For example, a first warning may be provided to an operator if the yard is scheduled to be operating at 90% or greater capacity within the foreseeable future. A second warning may be programmed, perhaps raising the warning level, if the usage is projected to be greater than 95% of the capacity of the yard. However, such thresholds are merely provided for illustration and the specific number of warning thresholds and the threshold level for each warning could be customized based on the needs of the transportation management system.

Therefore, from block 422 the process proceeds to block 430 and checks whether or not a warning situation exists. In this case, the warning situation may exist if certain thresholds are exceeded for estimated usage within a foreseeable time.

If no warning situation exists, the process may proceed from block 430 back to block 420 to again count the number of assets. In some cases, a delay as shown at block 432 may be provided so that the process does not take up too many resources at the server or computing device. For example, the process may be run every five minutes. However, other values for the delay are possible.

Further, rather than or in addition to a delay, in some embodiments the process may wait for a change in status to trigger it to run again. For example, an entry/exit event, when an approaching asset is a predetermined time/distance away, among other options, may trigger the process to be run again.

If a warning situation is found at block 430 then the process proceeds to block 440 in which an alert may be provided it to an operator. For example, the alert may be a warning message on a screen, a flashing light on a control panel, among other options. In other cases, the alert may be sent to the operator using Short Message Service (SMS) messages, email, a phone call, among other options.

In some cases, an overall system chart may be provided to operators. The problem yards can be identified to operators in a variety of ways. For example, the problem yards can be provided in a chart with colors representing warning levels. In other cases, the results may be presented on a map with geofence is colored by various warning levels seen at the yards. Other options are possible.

An operator of the transportation management system may then take action to mitigate the alert situation. For example, the operator may reroute traffic that is in transit to different shipping yards in some cases. In other cases, the driver of vehicles arriving at the shipping yard may be asked to wait in a queue outside of the yard to avoid creating situations where the vehicle or trailer will be blocking traffic within the yard.

In other cases, the alert at block 440 may be provided at the entrance and to the yard to inform drivers that are arriving at the yard. For example, the alert may indicate to drivers how many spots are left within the yard and therefore indicate to the driver whether the driver should enter the yard or not. The driver may further be provided, in some cases, with an indication of the location of at least one of the empty spots. This may be done through a dispatcher or an automatic system in some embodiments.

In other cases, the alert at block 440 can be provided to the drivers that are scheduled to arrive at the yard, for example utilizing a mobile device or vehicle console that can be viewed by the driver. Such alert may for example be provided by SMS, email, a phone call, among other options. This can cause the driver to for example, contact a dispatcher to obtain alternate routing, wait until there are spots available for entering the yard, among other actions.

The yard usage information can also be stored and used by operators of the transportation management systems in order to provide for future planning with regard to routing and yard usage. In particular, reference is now made to FIG. 5, which starts at block 510 and proceeds to block 512.

Figure 5:
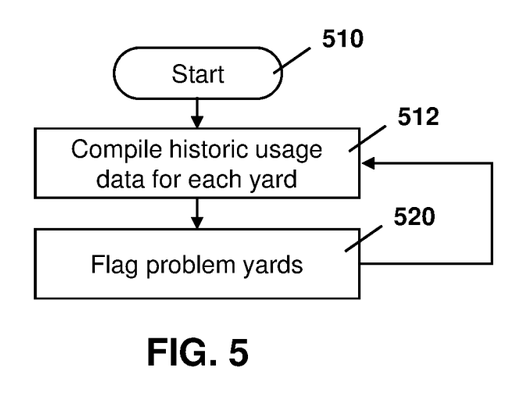
FIG. 5 is a process diagram showing a process at a network element for flagging problem shipping yards.

A computing device or server may, at block 512, compile historic usage data for each yard. Such compiling may involve storing information with regard to a current number of assets within a yard over a time period.

The process then proceeds to block 520 in which problem yards may be flagged for operators of the system. In particular, the historic yard usage data could be compared to yard capacity for each yard and the yards which exceed a threshold percentage of capacity could be flagged. In some cases, the flagging could occur if the yard is problematic over a time period. For example, if the yard is over a threshold percentage of capacity for greater than two hours on any given day, this may raise a flag.

In other cases, the flagging could occur if the yard reaches a threshold capacity greater than a threshold number of times over a time period. For example, if the yard exceeds the threshold capacity three times in any week, this may indicate a problem yard and cause the yard to be flagged.

The threshold capacity in this case may be the same or may be different than the threshold used to raise an alert. For example, for planning purposes, the threshold may be 80% capacity. However, this is merely an example and the value of 80% could be changed based on the needs of the operator.

The problem yards can be identified to operators in a variety of ways. For example, the problem yards can be provided in a chart with colors representing warning levels. In other cases, the results may be presented on a map with geofence is colored by various warning levels seen at the yards. In other cases, graphs or charts providing utilization of each shipping yard could be provided and perhaps broken into time of day or day of week data. Other options for presenting such results are possible.

From block 520 the process proceeds back to block 512 in which historic data can continue to be compiled.

In some cases, the process of FIG. 5 can be run periodically. For example, it may be run once a week. In this case, from block 520 the process may end.

An operator may review a report with the problem yards, and may take remedial action. For example, the scheduling algorithms may be programmed to schedule less loads to be delivered to the problem yard. In some cases, the scheduling may be relevant only to certain time periods in which the usage typically exceeds capacity thresholds.

In other cases, an operator may consider opening new yards, expanding existing yards, among other remedial actions.

While the embodiments of FIGS. 4 and 5 provide various functionality for a server, other functionally for the server would be apparent to those skilled in the art having regard to the present disclosure.

A server such as servers 340, 342 or 350 may be any network node. For example, one simplified server that may perform the embodiments described above is provided with regards to FIG. 6.

Figure 6:
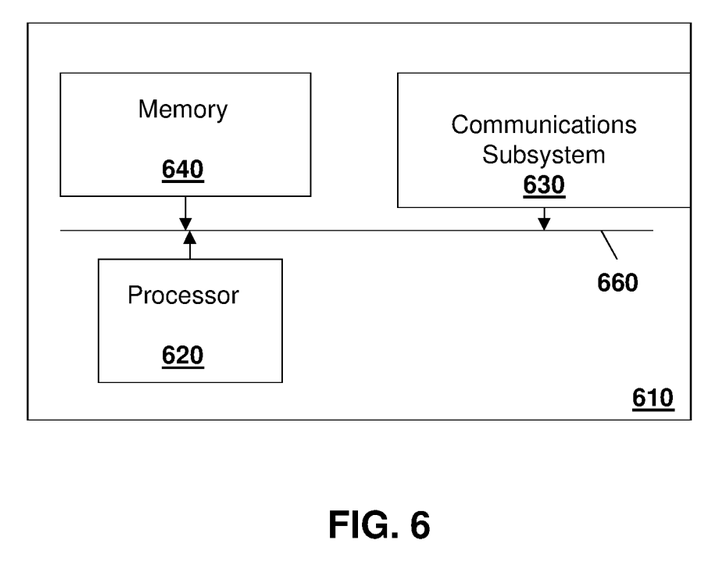
FIG. 6 is a block diagram of an example computing device capable of being used in accordance with the embodiments of the present disclosure.

In FIG. 6, server 610 includes a processor 620 and a communications subsystem 630, where the processor 620 and communications subsystem 630 cooperate to perform the methods of the embodiments described herein.

The processor 620 is configured to execute programmable logic, which may be stored, along with data, on the server 610, and is shown in the example of FIG. 6 as memory 640. The memory 640 can be any tangible, non-transitory computer readable storage medium, such as optical (e.g., CD, DVD, etc.), magnetic (e.g., tape), flash drive, hard drive, or other memory known in the art. In one embodiment, processor 620 may also be implemented entirely in hardware and not require any stored program to execute logic functions.

Alternatively, or in addition to the memory 640, the server 610 may access data or programmable logic from an external storage medium, for example through the communications subsystem 630.

The communications subsystem 630 allows the server 610 to communicate with other devices or network elements.

Communications between the various elements of the server 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a computing device for determining future utilization of a shipping yard, the method comprising: detecting a number of assets within the shipping yard; determining, based on asset scheduling information, future yard activity; and correlating the number of assets within the shipping yard with the future yard activity to provide a predictive yard utilization.

BB. The method of clause AA, wherein the detecting utilizes a geofence around the shipping yard and a positioning sensor on each asset to find the number of assets within the shipping yard.

CC. The method of clause AA or clause BB, wherein the detecting utilizes a sensor at ingress and egress points within the yard to find the number of assets within the shipping yard.

DD. The method of any one of clauses AA to CC, wherein the detecting utilizes at least one image capture device within the shipping yard to capture images of the yard and further utilizes image processing to find the number of assets within the shipping yard.

EE. The method of any one of clauses AA to DD, wherein the asset scheduling information includes a buffer time period for an arrival or departure time for each asset.

FF. The method of any one of clauses AA to EE, wherein the asset scheduling information is updated based on sensor information provided for at least one asset.

GG. The method of clause FF, wherein the sensor information includes a current position of the at least one asset, where the at least one asset is scheduled to arrive at the shipping yard.

HH. The method of clause FF or clause GG, wherein the sensor information includes information from a third party regarding a status of the at least one asset.

II. The method of any one of clauses AA to HH, further comprising, after the correlating, creating an alert when the future yard activity creates a shipping yard utilization greater than a threshold percentage of a capacity of the shipping yard.

JJ. The method of clause II, wherein a plurality of alerts is provided, each being created at a different threshold percentage of the capacity of the shipping yard.

KK. A computing device configured for determining future utilization of a shipping yard, the computing device comprising: a processor; and a communications subsystem; wherein the computing device is configured to: detect a number of assets within the shipping yard; determine, based on asset scheduling information, future yard activity; and correlate the number of assets within the shipping yard with the future yard activity to provide a predictive yard utilization.

LL. The computing device of clause KK, wherein the computing device is configured to detect using a geofence around the shipping yard and a positioning sensor on each asset to find the number of assets within the shipping yard.

MM. The computing device of clause KK or clause LL, wherein the computing device is configured to detect using a sensor at ingress and egress points within the yard to find the number of assets within the shipping yard.

NN. The computing device of any one of clauses KK to MM, wherein the computing device is configured to detect using at least one image capture device within the shipping yard to capture images of the yard and further utilizes image processing to find the number of assets within the shipping yard.

OO. The computing device of any one of clauses KK to NN, wherein the asset scheduling information includes a buffer time period for an arrival or departure time for each asset.

PP. The computing device of any one of clauses KK to OO, wherein the asset scheduling information is updated based on sensor information provided for at least one asset.

QQ. The computing device of clause PP, wherein the sensor information includes a current position of the at least one asset, where the at least one asset is scheduled to arrive at the shipping yard.

RR. The computing device of clause PP or clause QQ, wherein the sensor information includes information from a third party regarding a status of the at least one asset.

SS. The computing device of any one of clauses PP to RR, wherein the computing device is further configured to, after the correlating, create an alert when the future yard activity creates a shipping yard utilization greater than a threshold percentage of a capacity of the shipping yard.

TT. The computing device of clause SS, wherein a plurality of alerts is provided, each being created at a different threshold percentage of the capacity of the shipping yard.

The invention claimed is:

1. A method at a computing device for determining future utilization of a shipping yard, the method comprising:
   detecting a number of assets within the shipping yard, the detecting utilizing at least one image capture device on at least one moving vehicle within the shipping yard to capture images of the shipping yard and further utilizes image processing of captured images of the shipping yard to find the number of assets within the shipping yard;
   determining, based on asset scheduling information, future yard activity;
   correlating the number of assets within the shipping yard with the future yard activity to provide a predictive yard utilization; and
   creating, based on the predictive yard utilization, an alert indicating a number of empty spots within the yard.

2. The method of claim 1, wherein the detecting utilizes a sensor at ingress and egress points within the yard to find the number of assets within the shipping yard.

3. The method of claim 1, wherein the asset scheduling information includes a buffer time period for an arrival or departure time for each asset.

4. The method of claim 1, wherein the asset scheduling information is updated based on sensor information provided for at least one asset.

5. The method of claim 4, wherein the sensor information includes a current position of the at least one asset, where the at least one asset is scheduled to arrive at the shipping yard.

6. The method of claim 4, wherein the sensor information includes information from a third party regarding a status of the at least one asset.

7. The method of claim 1, further comprising, after the correlating, creating an alert when the future yard activity creates a shipping yard utilization greater than a threshold percentage of a capacity of the shipping yard.

8. The method of claim 7, wherein a plurality of alerts is provided, each being created at a different threshold percentage of the capacity of the shipping yard.

9. A computing device configured for determining future utilization of a shipping yard, the computing device comprising:
- a processor; and
- a communications subsystem;

wherein the computing device is configured to:
- detect a number of assets within the shipping yard, the detecting utilizing at least one image capture device on at least one moving vehicle within the shipping yard to capture images of the shipping yard and further utilizes image processing of captured images of the shipping yard to find the number of assets within the shipping yard;
- determine, based on asset scheduling information, future yard activity;
- correlate the number of assets within the shipping yard with the future yard activity to provide a predictive yard utilization; and
- create, based on the predictive yard utilization, an alert indicating a number of empty spots within the yard.

10. The computing device of claim 9, wherein the computing device is configured to detect using a sensor at ingress and egress points within the yard to find the number of assets within the shipping yard.

11. The computing device of claim 9, wherein the asset scheduling information includes a buffer time period for an arrival or departure time for each asset.

12. The computing device of claim 9, wherein the asset scheduling information is updated based on sensor information provided for at least one asset.

13. The computing device of claim 12, wherein the sensor information includes a current position of the at least one asset, where the at least one asset is scheduled to arrive at the shipping yard.

14. The computing device of claim 12, wherein the sensor information includes information from a third party regarding a status of the at least one asset.

15. The computing device of claim 9, wherein the computing device is further configured to, after the correlating, create an alert when the future yard activity creates a shipping yard utilization greater than a threshold percentage of a capacity of the shipping yard.

16. The computing device of claim 15, wherein a plurality of alerts is provided, each being created at a different threshold percentage of the capacity of the shipping yard.

17. A non-transitory computer readable medium for storing instruction code which, when executed by a processor of a computing device configured for determining future utilization of a shipping yard, cause the computing device to:
- detect a number of assets within the shipping yard, the detecting utilizing at least one image capture device on at least one moving vehicle within the shipping yard to capture images of the shipping yard and further utilizes image processing of captured images of the shipping yard to find the number of assets within the shipping yard;
- determining, based on asset scheduling information, future yard activity;
- correlate the number of assets within the shipping yard with the future yard activity to provide a predictive yard utilization; and
- create, based on the predictive yard utilization, an alert indicating a number of empty spots within the yard.

* * * * *